UNITED STATES PATENT OFFICE.

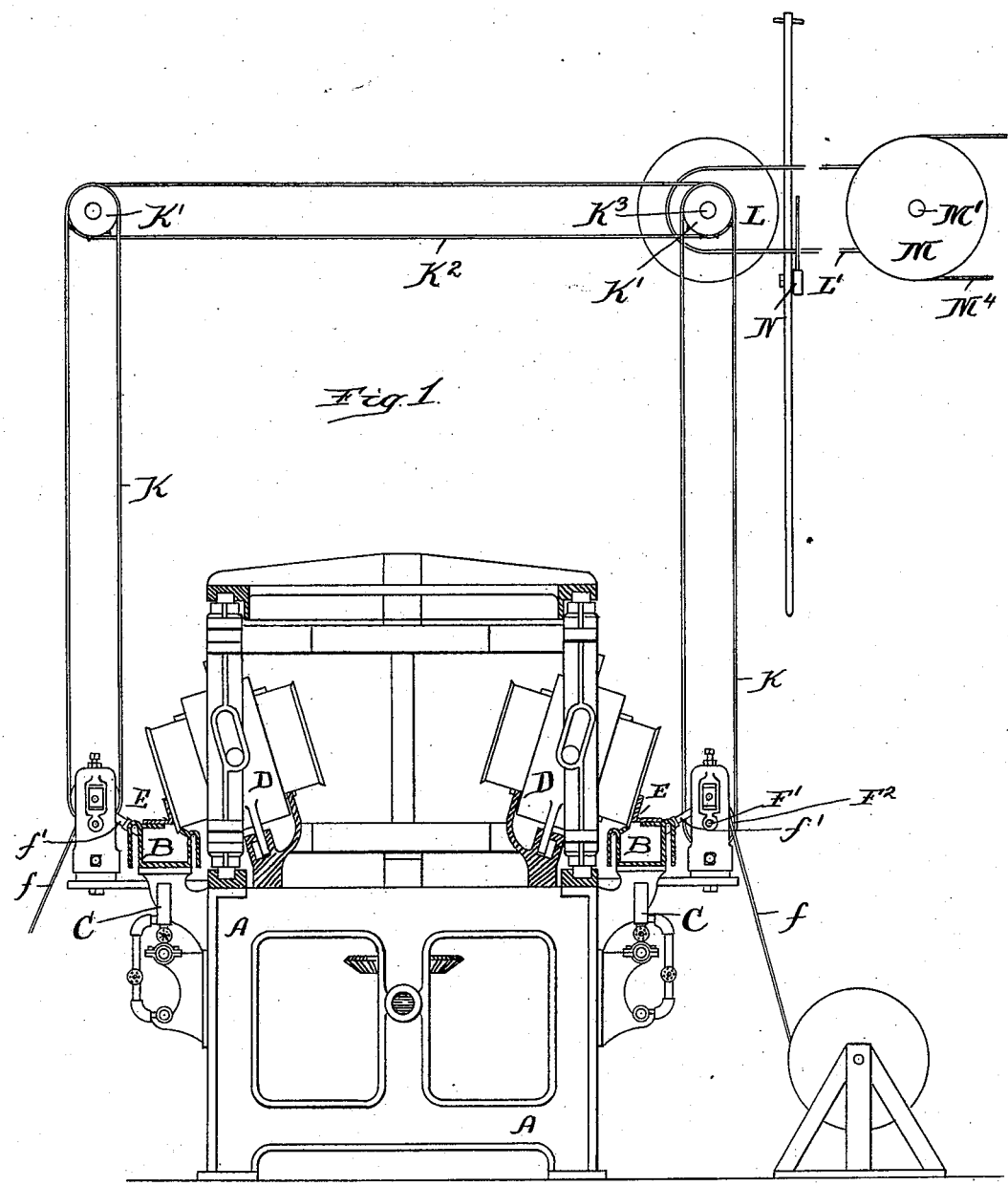

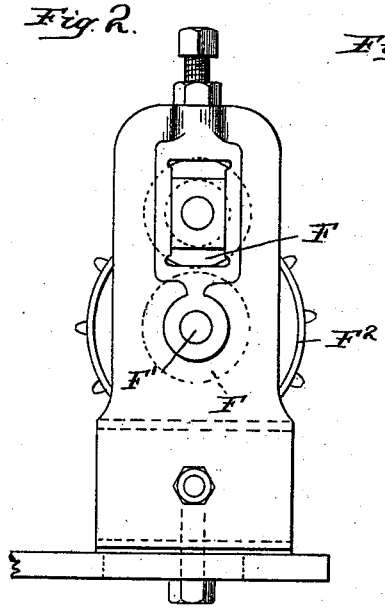
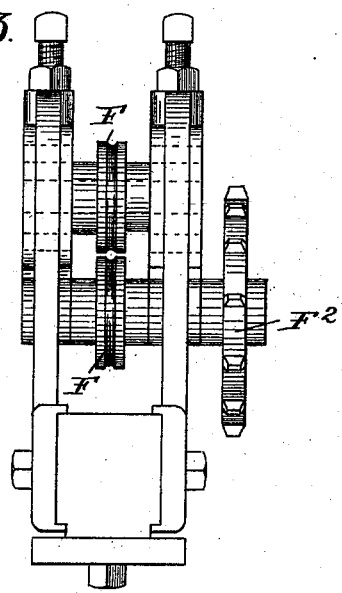
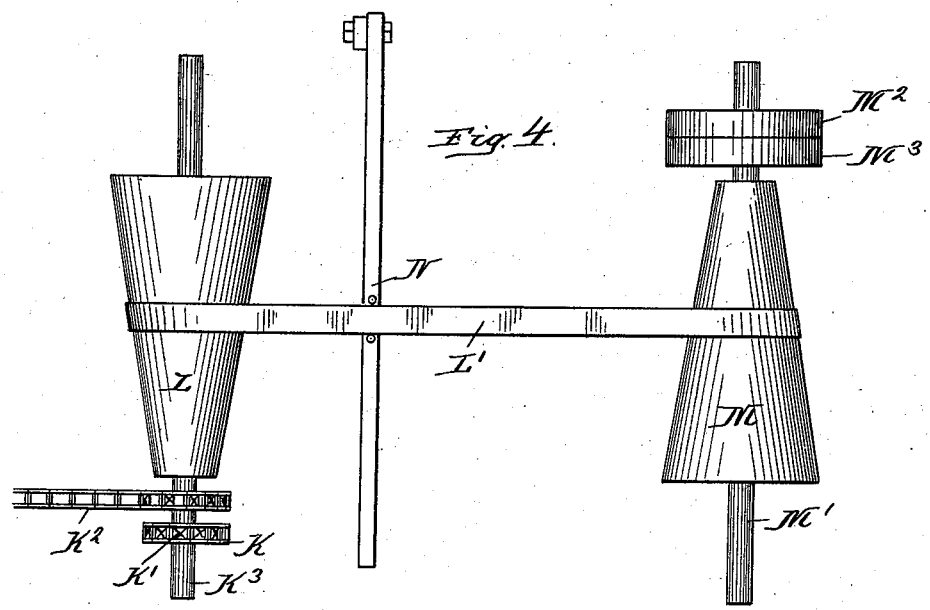

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

MACHINE FOR SOLDERING CANS.

SPECIFICATION forming part of Letters Patent No. 522,257, dated July 3, 1894.

Application filed October 4, 1892. Renewed March 14, 1894. Serial No. 503,558. (No model.)

*To all whom it may concern:*

Be it known that I, JOHN G. HODGSON, a citizen of the United States, residing in Maywood, in the county of Cook and State of Illinois, have invented a new and useful Improvement in Machines for Soldering Cans, of which the following is a specification.

My invention relates to can soldering machines, and more particularly to improvements in that class of soldering machines in which the can is soldered by means of a bath of molten solder over or along which the can is conveyed in such manner as to present the seam to be soldered in contact with the surface of the molten solder. Machines of this class are shown for example in Letters Patent Nos. 250,096, 274,362 and 354,731 and in other patents of the United States heretofore granted, familiar to those skilled in the art. In this class of machines it is important in order to do good work that the surface of the molten solder in the bath should be maintained at the proper height or level to properly coact with the mechanism by which the can is conveyed along over the bath and its seam presented thereto. If, for example, the level of the solder should, through accident or oversight, be allowed to get a little too low to properly immerse the seam of the can as it is carried along, the cans, or some of them, would be likely to be imperfectly soldered in parts. And in this class of machines it is also important to maintain the molten solder at an approximately uniform temperature; if it becomes too hot it is liable to unnecessary waste or deterioration; and if it becomes a little too cool to flow or sweat readily through the joint, imperfect work would be liable to be done.

My invention consists, in connection with a soldering machine wherein a bath of molten solder is employed, of a device for automatically and uniformly feeding or supplying wire solder to the bath as the same is used, so that the molten solder in the bath may be maintained constantly and automatically at a uniform quantity and at a uniform temperature.

In the accompanying drawings, which form a part of this specification, and in which similar letters of reference indicate like parts throughout all the views, Figure 1 is a cross sectional view, partly in elevation, of a soldering machine of a well known type to which my improvement has been applied. Fig. 2 is a detail end view of the wire solder feed rolls. Fig. 3 is a front view of said rolls and Fig. 4 is a detail plan view of the device for regulating the speed at which the wire solder is fed to the bath of molten solder, so that the feed may be made faster or slower to correspond to the amount of solder required for the particular cans upon which the machine may be operating.

It will be readily understood by those skilled in the art, that my improvement may be applied to any well known machine wherein a bath or vessel containing molten solder is employed. For convenience I have however chosen to show my invention as applied to the particular form of machine represented in the specification and drawings of Patent No. 354,731.

In the drawings A represents the frame of a soldering machine, B the bath or vessel containing the molten solder, C the gas burners or devices for heating or melting the solder, D the carrier or device for conveying the cans along and over the bath, and E the guide for the corner or seam of the can. All these parts are well known in construction and operation to those skilled in the art, and a full explanation of the same will be found by reference to said Patent No. 354,731.

F F are a pair of feed rolls by which the wire solder $f$ is fed to the solder vessel or bath B from the reel or spool of wire solder G. The wire solder $f$ after passing between the feed rolls F F issues into the solder vessel through a guide $f'$. One of these wire solder feed devices F F is provided for each of the solder baths or vessels B. The shaft $F'$ of one of the feed rolls F, preferably the lower one, is furnished with a pulley or sprocket wheel $F^2$ to which motion is communicated by the belts or chains K from the pulleys $K'$, one on each side of the machine. The shafts of the pulleys $K'$ are connected together by a belt or chain $K^2$. The shaft $K^3$ of one of the pulleys $K'$ is furnished with a cone pulley L which receives motion through the belt L' from the cone pulley M or the driving shaft M'. Motion is communicated to the shaft M' by the fast and loose pulleys M² M³ and driving belt M⁴.

N is a belt shifter for shifting the position of the belt L' on the cones L M to regulate the speed at which the wire solder is fed to the solder baths B B.

I claim—

1. In a soldering machine, the combination with a molten solder bath or vessel B and means for conveying the cans along and over the same, of a wire solder feed device for feeding the wire solder thereto continuously and uniformly, and means for operating said feed device substantially as specified.

2. In a soldering machine, the combination with a molten solder bath or vessel B and a carrier or conveyer for the cans, of a pair of wire solder feed rolls, and mechanism for driving said rolls and a device for regulating the speed thereof, substantially as specified.

3. In a soldering machine, the combination with solder bath B, of a can carrier or conveyer, wire solder feed rolls F F, pulley F², belt or chain K, pulley K', shaft K³, cone pulleys L, M, belt L' and belt shifter N, substantially as specified.

4. In a soldering machine, the combination with solder baths or vessels B B, a can carrier, two pairs of wire solder feed rolls F F, pulleys F² F², belts or chains K K, pulleys K' K', connecting belt and cone pulleys L, M, belt L', and belt shifter N, substantially as specified.

Dated at Chicago, September 30, 1892.

JOHN G. HODGSON.

Witnesses:
LEW. E. CURTIS,
EMMA HACK.